No. 805,646. PATENTED NOV. 28, 1905.
R. W. HUBBARD.
SNAP HOOK.
APPLICATION FILED MAR. 23, 1905.
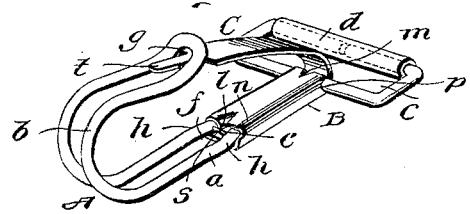
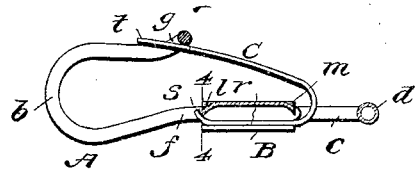
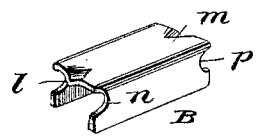
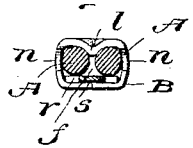
Witnesses
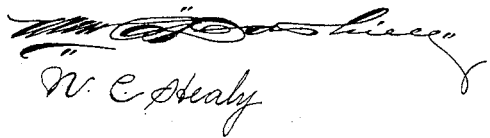
W. C. Healy
Inventor
R. W. Hubbard
By James Sheehy
Attorney

UNITED STATES PATENT OFFICE.

RICHARD W. HUBBARD, OF ASHTABULA, OHIO.

SNAP-HOOK.

No. 805,646.  Specification of Letters Patent.  Patented Nov. 28, 1905.

Application filed March 23, 1905. Serial No. 251,609.

*To all whom it may concern:*

Be it known that I, RICHARD W. HUBBARD, a citizen of the United States, residing at Ashtabula, in the county of Ashtabula and State of Ohio, have invented new and useful Improvements in Snap-Hooks, of which the following is a specification.

My invention pertains to snap-hooks of the spring-tongue type; and it has for its object the provision of such a snap-hook embodying a specific construction whereby its strength and durability is materially increased, and this without the employment of more material than is necessary in the construction of an ordinary snap-hook of similar type.

With the foregoing in mind the invention will be fully understood from the following description and claims, when taken in connection with the accompanying drawings, forming part of this specification, in which—

Figure 1 is a perspective view of my novel snap-hook. Fig. 2 is a longitudinal central section of the same. Fig. 3 is an enlarged perspective view of the sleeve of the hook removed, and Fig. 4 is an enlarged transverse section taken in the plane indicated by the line 4 4 of Fig. 2 and illustrating the manner in which the sleeve of the hook engages the shank thereof.

Similar letters designate corresponding parts in all of the views of the drawings, referring to which:—

A is the body of my novel snap-hook. The said body in the present and preferred embodiment of my invention is made of a single piece of wire of about the caliber illustrated and comprises a shank $a$, a hook proper, $b$, at one end of the shank, and an eye $c$ at the opposite end of the shank. In the making of the body the piece of wire is looped and bent to form the hook proper, $b$, the shank $a$, and the eye $c$, and the ends of the piece of wire are disposed in a sheet-metal barrel $d$, designed for the engagement of a harness-strap or the like. As plainly illustrated in Fig. 1 of the drawings, the stretches of wire forming the hook proper, $b$, and the forward portion of the shank $a$ are arranged a slight distance apart, while the stretches of wire forming the rear portion of the shank are arranged quite close together, as indicated by $e$ in Fig. 1. From this it follows that a space $f$ will be afforded between the stretches of wire in front of the shank portion $e$, and an opening $g$ will be provided in the hook proper, $b$, at the bight thereof; also that the arrangement of the portions of wire forming the hook proper and the forward portion of the shank a slight distance apart and the portions of wire forming the rear portion of the shank quite close together will contribute to the rigidity and strength of the body.

B is a sheet-metal sleeve, preferably of rectangular form in cross-section, which surrounds the shank $a$ between the eye $c$ and shoulders $h$, opposite the opening $f$, and is held against endwise movement by said eye $c$ and shoulders $h$, and C is the spring-tongue of the hook. The sleeve B is bent transversely around the shank portion $e$, so that its longitudinal edges rest quite close together below the shank, Figs. 2 and 4, and it is provided in its upper portion at its ends with depressions or teats $l\ m$ and is also provided in its side portions at its ends with notches $n\ p$, Figs. 1 and 3. The teats $l$ and $m$ rest between the stretches of wire adjacent to the opening $f$ and the eye $c$, respectively, while the notches $n$ and $p$ receive the shoulders $h$ and the inner bars of the eye $c$, respectively, as shown in Fig. 1, and from this it follows that the sleeve will be securely retained in position on the shank and will closely conform to all parts of the shank, so as not to be liable to catch into anything; also that the sleeve will tend to hold all of the parts of the body A in the relative positions shown and will thereby lend strength and durability to the body.

The tongue C is formed of a single piece of spring metal and terminates at one end in a straight flat portion $r$, which is interposed between one of the horizontal walls of the sleeve B and one side of the rear portion of the shank $a$ and has its forward end $s$ reduced and bent into the opening $f$, so as to hold the tongue against rearward movement and by engaging the teat $l$ to hold the sleeve B against casual forward movement, and thereby contribute materially to the strength and durability of the hook. From the sleeve B the tongue C extends rearwardly, then upwardly through the eye $c$, and then forwardly and upwardly to a point within the opening $g$ provided in the bight of the hook proper. At this latter point the tongue is reduced in width, as indicated by $t$, and is disposed in the said opening $g$ of the hook proper. By this arrangement of the reduced end $t$ of the tongue C in the opening $g$ of the hook proper a wide tongue and one of considerable strength may be employed without making the shank portion of the hook unduly wide, and yet the hook, or rather the bight portion thereof, is made to reinforce and strengthen the free portion of the tongue against both lateral and upward strain or pull.

It will be gathered from the foregoing that my novel hook is quite as simple as ordinary hooks of similar type extant, embodies no more material than the ordinary hooks, and is susceptible of being quite as easily manufactured, and yet all of the features of the novel hook contribute to the strength and durability thereof and enable it to withstand the rough usage to which snap-hooks are ordinarily subjected.

I have specifically described the present and preferred embodiment of my invention in order to impart a definite understanding of the said embodiment. I do not desire, however, to be understood as confining myself to the specific construction and relative arrangement of parts as shown and described, as such changes or modifications may be made in practice as fairly fall within the scope of my invention as claimed.

Having described my invention, what I claim, and desire to secure by Letters Patent, is—

1. In a snap-hook, the combination of a body comprising a shank formed of parallel portions of wire having shoulders at an intermediate point in the length of the shank and also having an opening between said shoulders, a hook proper at one end of the shank, and an eye at the opposite end of the shank, a metallic sleeve surrounding the shank, between the shoulders thereof and the eye, and having notches in its ends receiving the shoulders and the inner bar of the eye, and also having teats disposed between the portions of wire adjacent to the opening between the shoulders and the eye, and a spring-tongue having an end portion interposed and secured between the sleeve and shank, and also having a free portion normally closing the mouth of the hook proper.

2. In a snap-hook, the combination of a body comprising a shank formed of parallel portions of wire and having the rear part of said portions of wire arranged close together, and the forward part of said portions arranged a distance apart, whereby the portions are provided with intermediate shoulders, a hook proper arranged at the forward end of the shank, and having its portions arranged a distance apart whereby an opening is provided at its bight, and an eye arranged at the opposite end of the shank, a metallic sleeve surrounding the shank, between the shoulders and the eye, and a spring-tongue having an end portion interposed and secured between the shank and the sleeve and terminating in a reduced end disposed in the opening between the shoulders of the shank, and also having a free portion terminating in a reduced end normally disposed in the opening in the bight of the hook proper.

3. In a snap-hook, the combination of a body comprising a shank formed of parallel portions of wire and having the rear part of said portions of wire arranged close together and the forward part of said portions arranged a distance apart, whereby the portions are provided with intermediate shoulders, a hook proper arranged at the forward end of the shank and having its portions arranged a distance apart whereby an opening is provided at its bight and an eye arranged at the opposite end of the shank, a metallic sleeve surrounding the shank, between the shoulders thereof and the eye, and having notches in its ends receiving the shoulders and the inner bar of the eye, and also having teats on its upper portion disposed between the portions of wire adjacent to the opening between the shoulders and the eye, and a spring-tongue having a portion interposed and secured between the shank and the lower wall of the sleeve and terminating in a reduced end disposed in the opening between the shoulders of the shank and in front of the forward teat of the sleeve and also having a free portion terminating in a reduced end normally disposed in the opening in the bight of the hook proper.

In testimony whereof I have hereunto set my hand in presence of two subscribing witnesses.

RICHARD W. HUBBARD.

Witnesses:
C. J. KING,
FRANK T. TALCOTT.